United States Patent
Li et al.

(10) Patent No.: US 11,470,262 B2
(45) Date of Patent: Oct. 11, 2022

(54) TIME DIVISION MULTIPLEXING FILL LIGHT IMAGING APPARATUS AND METHOD

(71) Applicant: Huawei Technologies Co., Ltd., Shenzhen (CN)

(72) Inventors: Ruihua Li, Shenzhen (CN); Changcai Lai, Hangzhou (CN); Qingping Wang, Shenzhen (CN); Hongqi Hu, Hangzhou (CN); Xiaolei Chen, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 44 days.

(21) Appl. No.: 17/162,258

(22) Filed: Jan. 29, 2021

(65) Prior Publication Data

US 2021/0152728 A1 May 20, 2021

Related U.S. Application Data

(63) Continuation of application No. PCT/CN2019/083526, filed on Apr. 19, 2019.

(30) Foreign Application Priority Data

Jul. 30, 2018 (CN) .......................... 201810853813.3

(51) Int. Cl.
  *H04N 5/33* (2006.01)
  *H04N 5/235* (2006.01)
  *H04N 5/38* (2006.01)

(52) U.S. Cl.
  CPC ......... *H04N 5/2355* (2013.01); *H04N 5/2351* (2013.01); *H04N 5/38* (2013.01)

(58) Field of Classification Search
  CPC ........ H04N 5/235; H04N 5/38; H04N 5/2355; H04N 5/2351; H04N 5/33
  USPC ......................................................... 348/164
  See application file for complete search history.

(56) References Cited

U.S. PATENT DOCUMENTS

| | | | |
|---|---|---|---|
| 4,887,121 A | 12/1989 | Pritchard | |
| 10,291,859 B2* | 5/2019 | Tanaka | H04N 5/44504 |
| 10,742,890 B2* | 8/2020 | Nakata | H04N 5/2256 |
| 2006/0007346 A1 | 1/2006 | Nakamura et al. | |
| 2010/0141770 A1 | 6/2010 | Gomi | |
| 2017/0237887 A1 | 8/2017 | Tanaka et al. | |
| 2018/0332239 A1* | 11/2018 | Peterson | H04N 17/002 |
| 2020/0221037 A1 | 7/2020 | Lu et al. | |
| 2020/0225030 A1 | 7/2020 | Zheng et al. | |

(Continued)

FOREIGN PATENT DOCUMENTS

| | | |
|---|---|---|
| CN | 202475619 U | 10/2012 |
| CN | 202887451 U | 4/2013 |
| CN | 103152517 A | 6/2013 |

(Continued)

*Primary Examiner* — Trang U Tran
(74) *Attorney, Agent, or Firm* — Conley Rose, P.C.

(57) ABSTRACT

A time-division multiplexing fill light imaging method includes alternately generating a visible light frame and a fill light frame by using an image sensor, where the visible light frame is an image frame generated when the image sensor receives visible light but does not receive fill light, and the fill light frame is an image frame generated when the image sensor receives fill light, and combining a visible light frame and a fill light frame that are adjacent or consecutive, to obtain a composite frame.

17 Claims, 5 Drawing Sheets

(56) References Cited

U.S. PATENT DOCUMENTS

2021/0011358 A1\* 1/2021 Weng .................. G05D 1/0038

FOREIGN PATENT DOCUMENTS

| | | |
|---|---|---|
| CN | 104301623 A | 1/2015 |
| CN | 104408749 A | 3/2015 |
| CN | 105187727 A | 12/2015 |
| CN | 105959559 A | 9/2016 |
| CN | 106101530 A | 11/2016 |
| CN | 106488107 A | 3/2017 |
| CN | 106791462 A | 5/2017 |
| CN | 107202554 A | 9/2017 |
| CN | 107566747 A | 1/2018 |
| CN | 207248354 U | 4/2018 |
| WO | 2016075908 A1 | 5/2016 |

\* cited by examiner

Visible light frame + Fill light frame = Composite frame

TIME DIVISION MULTIPLEXING FILL LIGHT IMAGING APPARATUS AND METHOD

CROSS-REFERENCE TO RELATED APPLICATIONS

This application is a continuation of International Patent Application No. PCT/CN2019/083526 filed on Apr. 19, 2019, which claims priority to Chinese Patent Application No. 201810853813.3 filed on Jul. 30, 2018, both of which are hereby incorporated by reference in their entireties.

TECHNICAL FIELD

This application relates to the field of fill light imaging technologies, and in particular, to a time division multiplexing fill light imaging apparatus and method.

BACKGROUND

With rapid development of image applications, there is an increasingly high requirement for quality of imaging performed by an image collection device under low illuminance. Compared with imaging quality in a normal-illuminance scenario, imaging quality in a low-illuminance environment decreases. This is mainly reflected in a decrease in image brightness and an increase in noise. A most significant factor causing the decrease in the imaging quality is a decrease in an amount of light entering an image sensor. A signal-to-noise ratio of a signal output by the image sensor decreases. To resolve this problem, there are two common solutions. One solution is to increase an amount of visible light entering the image sensor under low illuminance, that is, to fill light by using a visible-light fill light device. Although light filling by using the visible light improves image brightness, light filling by using high-brightness visible light causes interference to a photographed object and results in image overexposure and distortion. The other solution is to use infrared imaging. In this manner, although sufficient image brightness can be obtained without causing obvious interference to a photographed object, true color information of the object cannot be satisfactorily obtained.

Therefore, how to obtain, in a low-illuminance environment, an image with true color information and appropriate brightness without interfering with a photographed object is an urgent problem to be resolved.

SUMMARY

This application provides a time division multiplexing fill light imaging method and an apparatus using the method. In a manner of generating a visible light frame and a fill light frame in time division multiplexing, a visible light frame and a fill light frame that are required for generating one composite frame are generated by a same image sensor, thereby effectively simplifying an imaging light path and an imaging device, and more efficiently generating a composite frame.

According to a first aspect, this application provides a fill light imaging apparatus, where the fill light imaging apparatus may include an image sensor, an optical unit, a fill light unit, and a processor. The image sensor is configured to alternately generate a visible light frame and a fill light frame. Herein, a type of the first frame generated when the fill light frame and the visible light frame are alternately generated is not limited, and may be the visible light frame, or may be the fill light frame. "alternately" means that the two types of image frames are generated in turn. For example, all generated odd-numbered frames are visible light frames, and all generated even-numbered frames are fill light frames, one fill light frame is generated every time two visible light frames are generated, two fill light frames are generated every time one visible light frame is generated, or the like. This is not limited herein. The optical unit is configured to form an image with light on the image sensor. The fill light unit is configured to fill light for a photographed object when the fill light frame is generated. The processor is configured to combine a visible light frame and a fill light frame that are adjacent or consecutive, to generate a composite frame. Compared with other approaches, this method allows the fill light imaging apparatus to alternately generate, in a time division multiplexing manner, the visible light frame and the fill light frame by using the same image sensor. In this way, a visible light frame and a fill light frame that are required for generating one composite frame no longer need to be generated by a plurality of image sensors, thereby effectively reducing production costs of an imaging device and difficulty in designing an imaging light path.

According to the first aspect, in a first possible implementation of the first aspect, the processor may be configured to control a switch of the fill light unit. Specifically, when the image sensor starts to generate the fill light frame, the processor controls the fill light unit to start to fill light, and when the image sensor finishes generating the fill light frame, the processor controls the fill light unit to stop filling light. Optionally, when the image sensor finishes generating the visible light frame, the processor may control the fill light unit to start to fill light, and when the image sensor starts to generate the visible light frame, the processor may control the fill light unit to finish filling light. This is not limited herein. A manner in which the processor controls the fill light unit to alternately fill light enables the fill light frame and the visible light frame to be alternately generated in consecutive image frames generated by the same image sensor, thereby improving utilization efficiency of the image sensor.

According to the first aspect, in a second possible implementation of the first aspect, the optical unit may be configured to control a type of light that can shine on the image sensor. When the image sensor starts to generate the fill light frame, the processor may control the optical unit to enable fill light to shine on the image sensor, and when the image sensor starts to generate the visible light frame, the processor may control the optical unit to enable fill light not to shine on the image sensor. Optionally, when the image sensor finishes generating the fill light frame, the processor may control the optical unit to enable fill light not to shine on the image sensor, and when the image sensor finishes generating the visible light frame, the processor may control the optical unit to enable fill light to shine on the image sensor. This is not limited herein. The processor controls the optical unit to alternately change an ability of the fill light to pass through the optical unit, so that the fill light frame and the visible light frame can be alternately generated in consecutive image frames generated by the same image sensor.

According to the second possible implementation of the first aspect, in a third possible implementation of the first aspect, the optical unit may include a light filter switching apparatus and a single-pass light filter. The single-pass light filter is configured to filter out a type of light other than visible light in an imaging light path of the optical unit, and the light filter switching apparatus is configured to place the single-pass light filter in or out of the imaging light path of the optical unit. Specifically, the processor is configured to, when the image sensor starts to generate the fill light frame, control the light filter switching apparatus to place the single-pass light filter out of the imaging light path of the optical unit, and when the image sensor starts to generate the visible light frame, control the light filter switching apparatus to place the single-pass light filter in the imaging light path of the optical unit. Optionally, when the image sensor finishes generating the fill light frame, the processor may control the light filter switching apparatus to place the single-pass light filter in the imaging light path of the optical unit, and when the image sensor finishes generating the visible light frame, the processor may control the light filter switching apparatus to place the single-pass light filter out of the imaging light path of the optical unit. This is not limited herein. The light filter switching apparatus switches between light filters to alternately change an ability of the fill light to pass through the optical unit, so that the fill light frame and the visible light frame can be alternately generated in consecutive image frames generated by the same image sensor.

Optionally, the optical unit may further include a dual-pass light filter, to filter out light other than the visible light and the fill light in the imaging light path. When the light other than the visible light and the fill light is filtered out, interference from the other light can be eliminated during imaging, thereby improving imaging quality.

Optionally, the processor may be configured to combine one visible light frame and one fill light frame that are adjacent, to generate a composite frame. The visible light frame and the fill light frame that are adjacent are generated at a short interval. Therefore, the generated composite frame has a smaller blur of motion, and an image is clearer.

Optionally, the processor may be configured to combine one or more visible light frames and one or more fill light frames, to obtain a composite frame, where the one or more visible light frames and the one or more fill light frames are consecutive. Combining by using a plurality of visible light frames and a plurality of fill light frames can enrich image information and reduce errors caused during combining.

Optionally, there may be one image sensor in the fill light imaging apparatus. Because the visible light frame and the fill light frame may be generated by a same image sensor, only one image sensor may be disposed in the fill light imaging apparatus, thereby reducing a device volume, avoiding a complex light path existing when there are a plurality of sensors, and reducing device costs and difficulty in design and manufacturing.

Optionally, color information of the composite frame may be color information of the visible light frame, and brightness information of the composite frame may be brightness information of the fill light frame. The composite frame uses the color information of the visible light frame and the brightness information of the fill light frame, so that both brightness and a color of an image are considered, and the obtained composite frame enriches the color of the image while sufficient brightness is ensured.

Optionally, fill light of the fill light unit may be infrared light. The infrared light has a comparatively strong penetration capability, is not easily blocked, and has comparatively low application costs.

Optionally, the fill light imaging apparatus may include an ambient light detection unit, configured to detect illuminance of ambient light. For example, the ambient light detection unit is a light sensitive resistor or another detection element. When the ambient light detection unit detects that the illuminance of the ambient light is equal to or less than a preset value, the image sensor starts to alternately generate the visible light frame and the fill light frame. In another implementation, the image sensor may alternatively detect illuminance of ambient light. Specifically, a gain value of the image sensor may be used as a criterion for determining the illuminance of the ambient light. A gain value of the image sensor corresponding to preset illuminance of the ambient light is used as a preset gain value. When a gain value is equal to or greater than the preset gain value, the image sensor starts to alternately generate the visible light frame and the fill light frame. When the illuminance of the ambient light is comparatively high, a high-quality image can be obtained without light filling. Fill light imaging is used only when it is detected that the illuminance of the ambient light is as low as the preset value, thereby helping save electric energy and prolonging a useful life of a fill light device.

Optionally, the processor may be further configured to, when the illuminance of the ambient light is equal to or less than the preset value, increase a frame rate at which the image sensor collects an image frame. In a possible implementation, when the illuminance of the ambient light is equal to or less than the preset value, the processor increases the frame rate at which the image sensor collects an image frame to a rate n times a collection frame rate used when the illuminance of the ambient light is greater than the preset value, where n is a sum of quantities of visible light frames and fill light frames that are required for generating one composite frame. Increasing the collection frame rate when fill light imaging starts helps reduce a drop in a frame rate at which the composite frame is output, to reduce a drop in output image quality. When the collection frame rate is increased to the rate n times the collection frame rate used when fill light imaging is not used, where n is the sum of the quantities of visible light frames and fill light frames that are required for generating one composite frame, the frame rate at which the composite frame is output is equal to an output frame rate existing when fill light imaging is not used. Therefore, when an imaging mode is switched, a comparatively stable output can be maintained for image quality, thereby improving user experience.

According to a second aspect, this application provides a terminal device. The terminal device may include the fill light imaging apparatus according to any one of the first aspect or all the possible implementations of the first aspect, and may further include a main processing module. The main processing module is configured to perform image processing on a composite frame. When including the fill light imaging module, the terminal device can obtain a high-quality image under low illuminance. The terminal device performs further processing on the obtained image. In addition, the terminal device needs to include only one image sensor, thereby saving device space, reducing device costs, and improving user experience.

Optionally, the terminal device may further include a communications module, and the communications module is configured to send an image or a video corresponding to the composite frame to another device through interface transmission or wireless transmission. Transmitting the image or the video corresponding to the composite frame to another device can meet a user's processing requirement for the image or the video corresponding to the composite frame, for example, transferring storage or interacting with another user, thereby improving user experience.

According to a third aspect, this application provides a fill light imaging method, including alternately generating a visible light frame and a fill light frame by using an image sensor, where the visible light frame is an image frame generated when the image sensor receives visible light but does not receive fill light, and the fill light frame is an image frame generated when the image sensor receives the fill light, and combining a visible light frame and a fill light frame that are adjacent or consecutive, to obtain a composite frame. Herein, a type of the first frame generated when the fill light frame and the visible light frame are alternately generated is not limited, and may be the visible light frame, or may be the fill light frame. "alternately" means that the two types of image frames are generated in turn. For example, all generated odd-numbered frames are visible light frames, and all generated even-numbered frames are fill light frames, one fill light frame is generated every time two visible light frames are generated, two fill light frames are generated every time one visible light frame is generated, or the like. This is not limited herein.

According to the third aspect, in a first possible implementation of the third aspect, light filling may be performed for a photographed object when generation of the fill light frame starts, and light filling is stopped when the generation of the fill light frame finishes. Optionally, light filling may start when generation of the visible light frame finishes, and light filling may finish when the generation of the visible light frame starts. This is not limited herein. A manner of alternately filling light enables the fill light frame and the visible light frame to be alternately generated in consecutive image frames generated by the same image sensor, thereby improving utilization efficiency of the image sensor.

According to the third aspect, in a second possible implementation of the third aspect, the alternately generating a visible light frame and a fill light frame by using an image sensor may include continuously filling light for the photographed object, and when generation of the visible light frame starts, using a single-pass light filter to filter out the fill light that shines on the image sensor, and when the generation of the fill light frame starts, stopping using the single-pass light filter, to enable the fill light to shine on the image sensor. Optionally, the alternately generating a visible light frame and a fill light frame by using an image sensor may alternatively include, when generation of the fill light frame finishes, using a single-pass light filter to filter out the fill light that shines on the image sensor, and when the generation of the visible light frame finishes, stopping using the single-pass light filter, to enable the fill light to shine on the image sensor. This is not limited herein. A manner of alternately filling light enables the fill light frame and the visible light frame to be alternately generated in consecutive image frames generated by the same image sensor, thereby improving utilization efficiency of the image sensor.

Optionally, a dual-pass light filter may be further used to filter out light other than the visible light and the fill light in an imaging light path. When the light other than the visible light and the fill light is filtered out, interference from the other light can be eliminated during imaging, thereby improving imaging quality.

Optionally, one visible light frame and one fill light frame that are adjacent may be combined, to generate a composite frame. The visible light frame and the fill light frame that are adjacent are generated at a short interval. Therefore, the generated composite frame has a smaller blur of motion, and an image is clearer.

Optionally, one or more visible light frames and one or more fill light frames may be combined, to obtain a composite frame, where the one or more visible light frames and the one or more fill light frames are consecutive. Combining by using a plurality of visible light frames and a plurality of fill light frames can enrich image information and reduce errors caused during combining.

Optionally, color information of the visible light frame may be extracted, brightness information of the fill light frame may be extracted, and the color information of the visible light frame and the brightness information of the fill light frame may be used as color information and brightness information of the composite frame, respectively. The composite frame uses the color information of the visible light frame and the brightness information of the fill light frame, so that both brightness and a color of an image are considered, and the obtained composite frame enriches the color of the image while sufficient brightness is ensured.

Optionally, the fill light frame is an image frame generated when the image sensor receives the fill light and the visible light, and the visible light frame is an image frame generated when the image sensor receives only the visible light but does not receive the fill light. That other light is not received during imaging can reduce interference from the other light, thereby improving imaging quality.

Optionally, the fill light may be an infrared light. The infrared light has a comparatively strong penetration capability, is not easily blocked, and has comparatively low application costs.

Optionally, when illuminance of ambient light is equal to or less than a preset value, the image sensor may be used to start to alternately generate the visible light frame and the fill light frame. When the illuminance of the ambient light is comparatively high, a high-quality image can be obtained without light filling. Fill light imaging is used only when it is detected that the illuminance of the ambient light is as low as the preset value, thereby helping save electric energy and prolonging a useful life of a fill light device.

Optionally, when the illuminance of the ambient light is equal to or less than the preset value, a frame rate at which the image sensor collects an image frame may be increased. In a possible implementation, when the illuminance of the ambient light is equal to or less than the preset value, the frame rate at which the image sensor collects an image frame may be increased to a rate n times a collection frame rate used when the illuminance of the ambient light is greater than the preset value, where n is a sum of quantities of visible light frames and fill light frames that are required for generating one composite frame. Increasing the collection frame rate when fill light imaging starts helps reduce a drop in a frame rate at which the composite frame is output, to reduce a drop in output image quality. When the collection frame rate is increased to the rate n times the collection frame rate used when fill light imaging is not used, where n is the sum of the quantities of visible light frames and fill light frames that are required for generating one composite frame, the frame rate at which the composite frame is output is equal to an output frame rate existing when fill light imaging is not used. Therefore, when an imaging mode is switched, a comparatively stable output can be maintained for image quality, thereby improving user experience.

DESCRIPTION OF EMBODIMENTS

Figure 1:
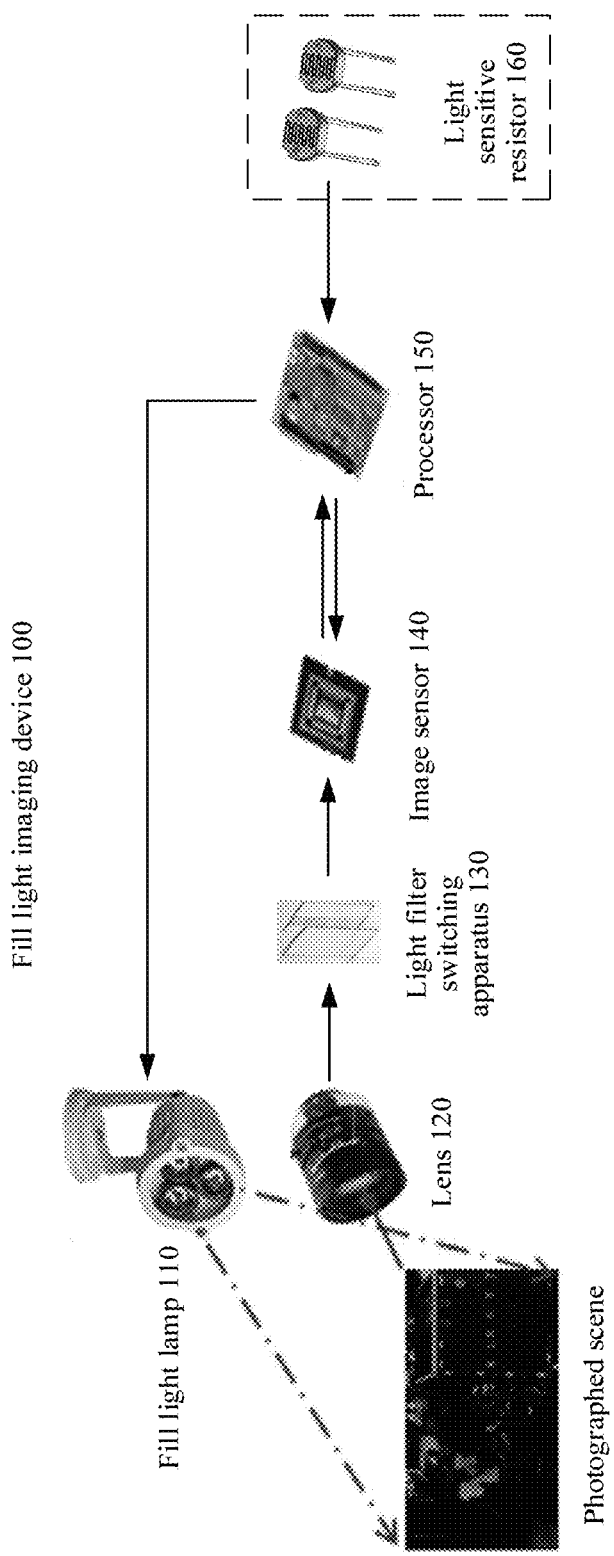
FIG. 1 is a schematic apparatus diagram of a fill light imaging apparatus.

The following clearly describes the technical solutions in the embodiments of this application with reference to the accompanying drawings in the embodiments of this application.

The accompanying drawings and descriptions provided in the following and various embodiments in this patent document describe principles of this application by using examples only, and shall not be construed as a limitation on the scope of this application in any manner. Visible light mentioned in this application is an electromagnetic wave with a wavelength greater than 400 nanometers (nm) and less than 700 nm. Non-visible light mentioned in this application is an electromagnetic wave with a wavelength outside a wavelength interval of the visible light. A person of ordinary skill in the art easily learns that the principles of this application may be implemented in any type of suitable device or system. Specifically, a time division multiplexing fill light imaging method in this application may be used for a photographing camera, a surveillance camera, and the like, especially to image obtaining in a low-illuminance environment, for example, photographing at night, video shooting at night, or video surveillance in the low-illuminance environment. An application scenario, an apparatus composition manner, a fill light source type, fill light frame exposure frequency, and the like that are described in the embodiments of this application are intended to describe the technical solutions in the embodiments of this application more clearly, and do not constitute a limitation on the technical solutions provided in the embodiments of this application. A person skilled in the art may learn that as the application scenario, apparatus composition, and the fill light source type change, the technical solutions provided in the embodiments of this application are still applicable to a similar technical problem.

For ease of description, an infrared light source is used as an example of a fill light source in the embodiments of this application, a fill light frame in the embodiments of this application is obtained in a manner of filling light once every other frame, that is, performing exposure only on an odd-numbered frame or only on an even-numbered frame, and a composite frame is generated by combining one fill light frame and one visible light frame that are adjacent. It should be noted that the fill light source in this application may be one or more of non-visible light sources that can be used for imaging, such as an infrared light source, an ultraviolet light source, and an X-ray light source. This is not limited herein. Any manner of alternately generating a visible light frame and a fill light frame in this application may be used to achieve objects of this application. That is, using any exposure interval, for example, exposing one fill light frame every other two visible light frames, or exposing two fill light frames every other visible light frame, complies with the technical solutions in this application. This is not limited herein. Correspondingly, in this application, a composite frame may be generated by combining any quantity of visible light frames and any quantity of exposed frames, where the any quantity of visible light frames and the any quantity of exposed frames are adjacent or consecutive. In an embodiment, any solution of generating one composite frame by using a consecutive frame sequence that includes both at least one visible light frame and at least one fill light frame complies with the technical solutions in this application. This is not limited herein.

FIG. 1 is a schematic diagram of a physical structure of a time division multiplexing fill light imaging apparatus according to a possible embodiment of this application. As shown in FIG. 1, the imaging device 100 includes a fill light lamp 110, a lens 120, an image sensor 140, a light filter switching apparatus 130, and a processor 150. In some possible implementations, the imaging device 100 may not include the light filter switching apparatus 130, or the light filter switching apparatus 130 may be replaced with a fixed light filter. In some possible implementations, the imaging device 100 further includes a light sensitive resistor 160.

The fill light lamp 110 is configured to fill light for a photographed object, and may be implemented as an infrared light-emitting diode (LED) fill light lamp. An emission center wavelength that can be used includes but is not limited to 760 nm, 850 nm, or 950 nm. The fill light lamp 110 may be turned on or off under control of the processor 150. A switch of the fill light lamp 110 may be controlled by a Boolean value or a level signal.

The lens 120 is configured to capture light for imaging on the image sensor 140. An implementation includes but is not limited to a wide-angle lens, a standard lens, a long-focus lens, a zoom lens, a back-focus lens, or a pinhole lens.

The image sensor 140 is configured to convert a received optical signal into an electrical signal, and generate, based on the electrical signal, a digital image signal that uses a frame as a separation unit. The image sensor 140 may implement conversion between the optical signal and the electrical signal by using a charge-coupled device (CCD) or complementary metal-oxide-semiconductor (CMOS). A process in which the image sensor 140 finally converts the received optical signal into the digital image signal that uses a frame as a separation unit may be referred to as image exposure. A frame generated through exposure during which infrared light used for light filling is not received is referred to as a visible light frame, and a frame generated through exposure during which infrared light used for light filling is received is referred to as a fill light frame. The image sensor 140 generates a start-of-frame signal and an end-of-frame signal when image exposure starts and ends, respectively, and sends the start-of-frame signal and the end-of-frame signal to the processor 150, to notify the processor 150 that exposure starts and ends. When generating the fill light frame, the image sensor 140 may not receive visible light when receiving the infrared light used for light filling, or may receive both the infrared light used for light filling and visible light. This is not limited herein.

The light filter switching apparatus 130 is configured to switch between light filters. The light filter is an optical element with a feature of selectively absorbing different bands of light. A possible implementation includes but is not limited to colored glass and dyed film. By switching between different light filters, the light filter switching apparatus 130 may control specific bands of light, in light collected by the lens 120, that can shine on the image sensor 140. In a possible implementation, when a fill light imaging mode is not enabled, the light filter switching apparatus 130 places, in a light path of the lens 120, a single-pass light filter that allows only the visible light to pass, so that only the visible light shines on the image sensor 140, and when the fill light imaging mode is enabled, the light filter switching apparatus 130 replaces the light filter with a dual-pass light filter, so that both the infrared light and the visible light can shine on the image sensor 140. In another possible implementation, when a fill light imaging mode is enabled, the light filter switching apparatus 130 periodically switches between light filters at specific frequency corresponding to frequency at which the fill light frame is generated, so that types of bands of light that can shine on the image sensor 140 periodically change. Optionally, the light filter switching apparatus 130 may include both the single-pass light filter and the dual-pass light filter, and periodically switch the single-pass light filter and the dual-pass light filter at frame exposure frequency of the image sensor 140, or the light filter switching apparatus 130 may include only the single-pass light filter, and periodically place the single-pass light filter in or out of an imaging light path of the fill light imaging apparatus 100 at frame exposure frequency of the image sensor 140. In some possible implementations, the fill light imaging apparatus 100 may alternatively not include the light filter switching apparatus 130, and instead may directly use a fixed specific light filter, so that light shining on the image sensor is light of several fixed bands, or the fill light imaging apparatus 100 may not use a light filter, so that all bands of light collected by the lens 120 shine on the sensor. This is not limited herein in this embodiment.

The processor 150 is configured to control turned-on and turned-off of the fill light lamp 110, control a collection frame rate of the image sensor 140, perform basic processing on the digital image signal, and combine the visible light frame and the fill light frame. When the imaging device 100 includes the light filter switching apparatus 130, the processor 150 is further configured to control the light filter switching apparatus 130. Basic processing performed by the processor 150 on an image includes but is not limited to demosaicing and automatic white balancing. Combining the visible light frame and the fill light frame means generating a composite frame by using the visible light frame and the fill light frame. Brightness information of the composite frame is from the fill light frame, and chrominance information of the composite frame is from the visible light frame. In some possible implementations, the processor 150 controls the light filter switching apparatus 130 to replace a light filter with the dual-pass light filter, and alternately turns on and off the fill light lamp 110 based on the start-of-frame signal and the end-of-frame signal that are received from the image sensor 140, so that the image sensor 140 periodically receives the infrared light during exposure, and then generates the fill light frame at corresponding periodic frequency. In some other possible implementations, the processor 150 controls the fill light lamp 110 to be steady on, and controls, based on the start-of-frame signal and the end-of-frame signal that are received from the image sensor 140, the light filter switching apparatus 130 to switch between a visible light filter and the dual-pass light filter, so that the image sensor 140 periodically receives the infrared light during exposure, and then alternately generates the fill light frame and the visible light frame. Functions of the processor 150 may be implemented by one processor, or may be jointly implemented by a plurality of processors, or some or all of the functions may be integrated in the image sensor 140. This is not limited herein.

The light sensitive resistor 160 is configured to detect a change in illuminance of ambient light. When the illuminance of the ambient light is equal to or less than a preset value, the fill light imaging apparatus 100 enables the fill light imaging mode.

Figure 2A:
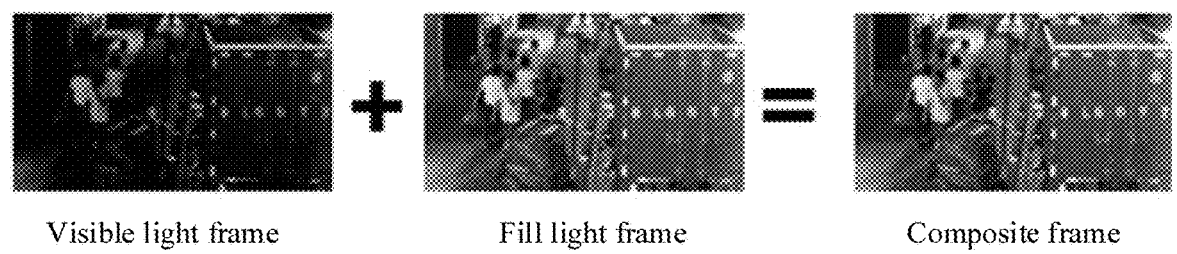
FIG. 2A is a schematic diagram of an effect of a generated composite frame.

FIG. 2A is a schematic diagram of image frame combining. For a same scene, a fill light imaging apparatus generates a visible light frame and a fill light frame, and combines the visible light frame and the fill light frame to generate a composite frame. The visible light frame is an image frame generated by an image sensor through exposure with presence of visible light and absence of fill light. In a case of low illuminance, brightness information of the visible light frame is insufficient, but color information of the visible light frame is comparatively satisfactory. The fill light frame is an image frame generated through exposure with presence of both the visible light and infrared light that is used for light filling. Brightness of the fill light frame is higher than brightness of the visible light frame, but the fill light frame lacks color information. In some possible implementations, the fill light frame may be alternatively generated by a sensor through exposure under only infrared light. The composite frame is obtained by combining the visible light frame and the fill light frame. Specifically, the composite frame retains the color information of the visible light frame and brightness information of the fill light frame.

Figure 2B:
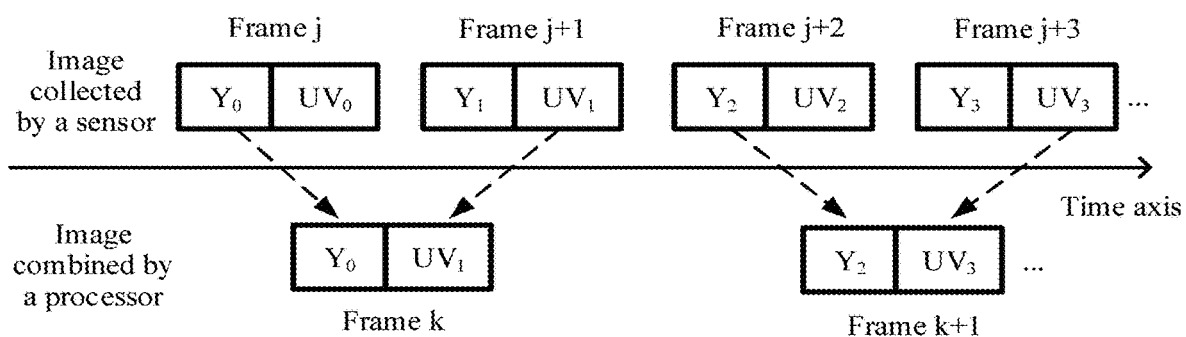
FIG. 2B is a schematic diagram of a composite frame generation manner.

FIG. 2B shows a possible method embodiment for combining a visible light frame and a fill light frame in luma-chrominance-chroma (YUV) color space. A frame j, a frame j+1, a frame j+2, and a frame j+3 represent image frames sequentially collected by an image sensor in a time sequence. The frame j and the frame j+2 are visible light frames, and the frame j+1 and the frame j+3 are fill light frames. A frame k represents a composite frame obtained by combining the frame j and the frame j+1, and a frame k+1 represents a composite frame obtained by combining the frame j+2 and the frame j+3. YUV is a color coding method, and is used for coding true-color color space, where "Y" represents luma, and "UV" represents chrominance and chroma. In the figure, $Y_0$ represents brightness information of the visible light frame j, and $UV_0$ represents color information of the visible light frame j, $Y_1$ represents brightness information of the fill light frame j+1, and $UV_1$ represents color information of the fill light frame j+1, $Y_2$ represents brightness information of the visible light frame j+2, and $UV_2$ represents color information of the visible light frame j+2, and $Y_3$ represents brightness information of the fill light frame j+3, and $UV_3$ represents color information of the fill light frame j+3. When generating the composite frame k, a processor uses the brightness information $Y_0$ of the frame j and the color information $UV_1$ of the frame j+1. Likewise, the composite frame k+1 uses the brightness information $Y_2$ of the frame j+2 and the color information $UV_3$ of the frame j+3.

If a composite image frame is denoted as I', and an image frame collected by the image sensor is denoted as I, a relationship between I and I' of a frame n (n is a natural number) may be expressed by using the following formula:

$$I'_Y(n)=I_Y(2n-1)$$

$$I'_{UV}(n)=I_{UV}(2n)$$

or $$I'_Y(n)=I_Y(2n)$$

$$I'_{UV}(n)=I_{UV}(2n-1)$$

In this embodiment, a fill light frame is obtained at the following frequency obtaining one fill light frame every other visible light frame. In an embodiment, an odd-numbered frame is a visible light frame, and an even-numbered frame is a fill light frame, or an odd-numbered frame is a fill light frame, and an even-numbered frame is a visible light frame. Frame combining is implemented in a manner of combining one visible light frame and one fill light frame into one composite frame. It should be noted that if other frequency of obtaining a fill light frame is used, for example, obtaining one fill light frame every other two visible light frames or obtaining two fill light frames every other visible light frame, the technical solutions described in this application are also applicable. Correspondingly, if another combining manner is used for generating a composite frame, for example, combining one visible light frame and two fill light frames to generate one composite frame, the technical solutions described in this application are also applicable. In addition, if frame combining is performed in other color space, for example, red-green-blue (RGB) space, hue-saturation-value (HSV) space, or the International Commission on Illumination (CIE) L*a*b* (CIELAB) space, principles thereof are similar to a process shown in FIG. 2B, and details are not described herein again.

Figure 3:
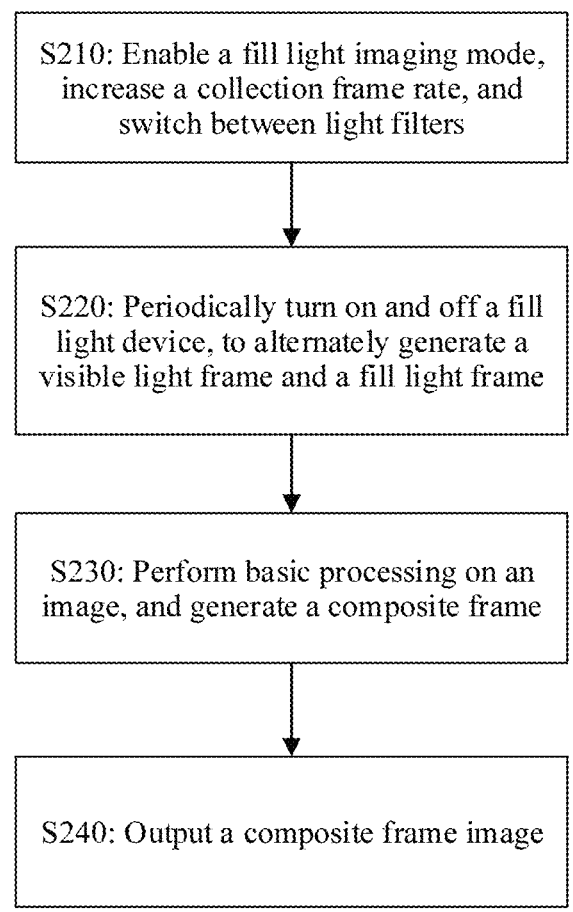
FIG. 3 is a schematic flowchart of a fill light imaging method.

FIG. 3 shows an embodiment of a time division multiplexing fill light imaging method according to this application.

S210. Enable a fill light imaging mode, increase a collection frame rate, and switch between light filters. An imaging device monitors illuminance of ambient light in real time. When the illuminance of ambient light is equal to or lower than highest illuminance that requires light filling, the fill light imaging method according to this application is used. The illuminance of ambient light may be estimated by using gain information of an image sensor. As the illuminance of ambient light decreases, a gain of the image sensor gradually increases. Therefore, a specific gain value (for example, 36 decibels (dB)) of the image sensor may be set as a determining criterion, and used as a determining value of the highest illuminance that requires light filling. When a gain is equal to or greater than the preset value, it is determined that the illuminance of ambient light is equal to or lower than the highest illuminance that requires light filling, and the fill light imaging method according to this application is used. In some possible implementations, a dedicated brightness detection component (for example, a light sensitive resistor) may be alternatively used to detect a change in illuminance of ambient light. This is not limited herein. The collection frame rate is increased, and the light filters are switched. When the fill light imaging mode is enabled, the imaging device increases an image collection frame rate, for example, changes 25 frames/second to 50 frames/second. During generation of a composite frame, each pair of an odd-numbered frame and an even-numbered frame that are consecutive is combined to generate one composite frame. Therefore, increasing the collection frame rate can reduce or eliminate a drop in a final output frame rate. In this embodiment, when the collection frame rate doubles, the final output frame rate is the same as an output frame rate existing before the fill light imaging mode is used, thereby ensuring image output quality. When the fill light imaging mode is enabled, the imaging device further replaces a light filter with a dual-pass light filter, to filter out light other than visible light and infrared light in collected light, thereby improving imaging quality. In another possible implementation, S210 may include only increasing the collection frame rate, and not include switching between the light filters.

S220. Periodically turn on and off an infrared fill light source, to alternately generate a fill light frame and a visible light frame. After the fill light imaging mode is enabled, the imaging device periodically turns on and off the infrared fill light source at image frame generation frequency. Periodically turning on and off the infrared fill light source herein may be as follows turning on the infrared fill light source for an odd-numbered frame and turning off the infrared fill light source for an even-numbered frame, or turning off the infrared fill light source for an odd-numbered frame and turning on the infrared fill light source for an even-numbered frame. Correspondingly, in image frames generated by the image sensor, in the former case, all odd-numbered frames are fill light frames, and all even-numbered frames are visible light frames, and in the latter case, all odd-numbered frames are visible light frames, and all even-numbered frames are fill light frames.

Frequency of turning on and off the infrared fill light source may be synchronized with the image frame generation frequency by using a frame interrupt signal generated by the image sensor. When generating an image frame, the image sensor generates frame interrupt signals to indicate that frame exposure starts and ends. Specifically, frame start information and frame end information of the image frame are recorded in the frame interrupt signals. A possible implementation of the frame interrupt signal includes but is not limited to fstart(ISP_FE), fstart(ISP_BE), cfg_loss(ISP_FE), and cfg_loss(ISP_BE). When the fill light imaging mode is enabled, the image sensor sends the generated frame interrupt signals to a processor. The processor counts the frame interrupt signals from 0 and adds 1 to a count every time one frame interrupt signal is received. In a possible implementation, when the frame interrupt signal count is an odd number, the processor turns on the infrared fill light source when detecting a start-of-frame signal, and in this case, the infrared fill light source starts to fill light for a scene, or the processor turns off the infrared fill light source when detecting an end-of-frame signal, and in this case, light filling ends. When the frame interrupt signal count is an even number, no operation is performed on the fill light source. In this way, in the image frames generated by the image sensor, all odd-numbered frames are fill light frames, and all even-numbered frames are visible light frames. In another possible implementation, when the frame interrupt signal count is an even number, the processor turns on the infrared fill light source when detecting a start-of-frame signal, and in this case, the infrared fill light source starts to fill light for a scene, or the processor turns off the infrared fill light source when detecting an end-of-frame signal, and in this case, light filling ends. When the frame interrupt signal count is an odd number, no operation is performed on the fill light source. In this way, in the image frames generated by the image sensor, all even-numbered frames are fill light frames, and all odd-numbered frames are visible light frames.

S230. Perform basic processing on an image, and generate a composite frame. The imaging device performs basic processing on the image frame, specifically including but not limited to demosaicing and automatic white balancing. Generating a composite frame means combining the visible light frame and the fill light frame to generate a composite frame. Brightness information of the composite frame is from the fill light frame, and chrominance information of the composite frame is from the visible light frame. For a specific combining manner, refer to descriptions of FIG. 2A and FIG. 2B, and details are not described herein again. There is no limitation on an order in which basic processing on an image and generation of a composite frame are performed. Basic processing may be first performed on the visible light frame and the fill light frame, and then a composite frame is generated, or a composite frame may be first generated, and then basic processing is performed on the composite frame. This is not limited herein.

S240. Output a composite frame image.

Figure 4:
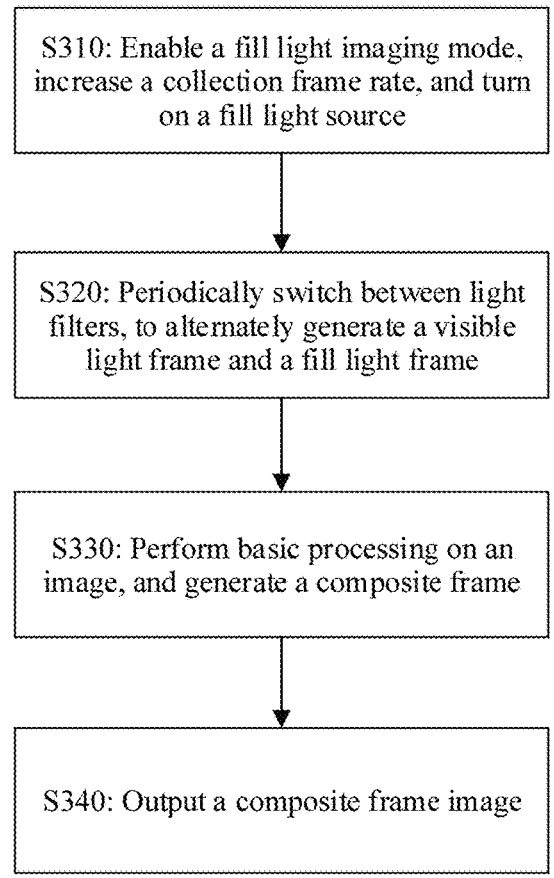
FIG. 4 is a schematic flowchart of another fill light imaging method.

FIG. 4 shows another embodiment of a time division multiplexing fill light imaging method according to this application.

S310. Enable a fill light imaging mode, increase a collection frame rate, and turn on a fill light source. A specific manner of enabling the fill light imaging mode is the same as that described in S210, and details are not described herein again. When the fill light imaging mode is enabled, an imaging device increases an image collection frame rate, for example, changes 25 frames/second to 50 frames/second. In this embodiment, when the collection frame rate doubles, a final output frame rate is the same as an output frame rate existing before the fill light imaging mode is used, thereby ensuring image output quality. When the fill light imaging mode is enabled, the imaging device further turns on the fill light source to fill infrared light for a photographed object.

S320. Periodically switch between light filters, to alternately generate a visible light frame and a fill light frame. After the fill light imaging mode is enabled, the imaging device periodically switches between a single-pass light filter and a dual-pass light filter at image frame generation frequency. Herein, the single-pass light filter is a light filter that allows only visible light to pass, and the dual-pass light filter is a light filter that allows only the visible light and the infrared light to pass. Periodically switching between the light filters herein may be as follows using the single-pass light filter for an odd-numbered frame and using the dual-pass light filter for an even-numbered frame, or using the dual-pass light filter for an odd-numbered frame and using the single-pass light filter for an even-numbered frame. Correspondingly, in image frames generated by an image sensor, in the former case, all odd-numbered frames are visible light frames, and all even-numbered frames are fill light frames, and in the latter case, all odd-numbered frames are fill light frames, and all even-numbered frames are visible light frames.

Frequency of switching between the light filters may be synchronized with the image frame generation frequency by using a frame interrupt signal generated by the image sensor. For specific characteristics of the frame interrupt signal, refer to a description of the embodiment shown in FIG. 3, and details are not described herein again. When the fill light imaging mode is enabled, the image sensor sends generated frame interrupt signals to a processor. The processor counts the frame interrupt signals from 0 and adds 1 to a count every time one frame interrupt signal is received. In a possible implementation, when the frame interrupt signal count is an odd number, the processor replaces a light filter with the single-pass light filter when detecting a start-of-frame signal, and in this case, only the visible light can shine on the image sensor, or when the frame interrupt signal count is an even number, the processor replaces a light filter with the dual-pass light filter when detecting a start-of-frame signal, and in this case, both the visible light and the infrared light can shine on the image sensor. In this way, in the image frames generated by the image sensor, all even-numbered frames are fill light frames, and all odd-numbered frames are visible light frames. In another possible implementation, when the frame interrupt signal count is an odd number, the processor replaces a light filter with the dual-pass light filter when detecting a start-of-frame signal, and in this case, both the visible light and the infrared light can shine on the image sensor, or when the frame interrupt signal count is an even number, the processor replaces a light filter with the single-pass light filter when detecting a start-of-frame signal, and in this case, only the visible light can shine on the image sensor. In this way, in the image frames generated by the image sensor, all odd-numbered frames are fill light frames, and all even-numbered frames are visible light frames.

S330. Perform basic processing on an image, and generate a composite frame. For this step, refer to a description of the embodiment shown in FIG. 3, and details are not described herein again.

S340. Output a composite frame image.

Figure 5:
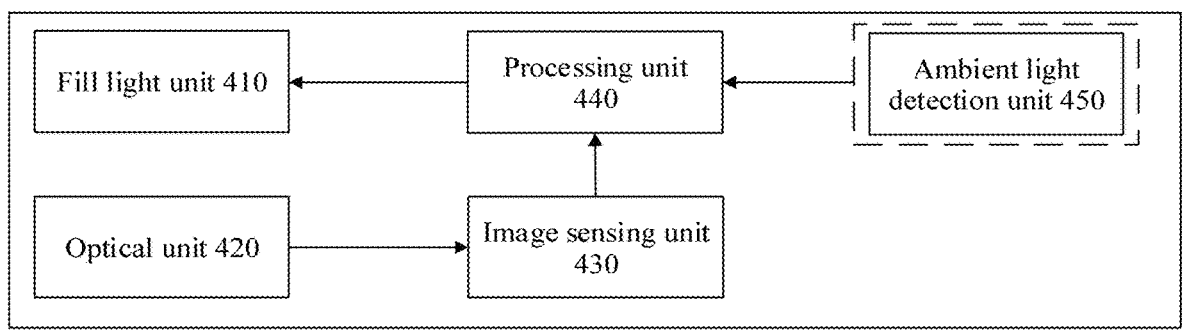
FIG. 5 is a schematic diagram of a logical structure of a fill light imaging apparatus.

FIG. 5 is a schematic diagram of a logical structure of a time division multiplexing fill light imaging apparatus according to a possible embodiment of this application.

As shown in FIG. 5, the imaging device 400 includes a fill light unit 410, an optical unit 420, an image sensing unit 430, and a processing unit 440. In some possible implementations, the imaging device 400 may further include an ambient light detection unit 450.

The fill light unit 410 is configured to fill light for a photographed object, and may be implemented as an infrared LED fill light lamp. An emission center wavelength that can be used includes but is not limited to 760 nm, 850 nm, or 950 nm. The fill light unit 410 may be turned on or off under control of the processing unit 440.

The optical unit 420 is configured to capture light for imaging on the image sensing unit 430, and may be implemented as a lens, including but not limited to a wide-angle lens, a standard lens, a long-focus lens, a zoom lens, a back-focus lens, or a pinhole lens. In some possible implementations, the optical unit 420 may further include a light filter, so that only light of a specific wavelength can shine on the image sensing unit 430.

The image sensing unit 430 is configured to convert a received optical signal into an electrical signal, and generate, based on the electrical signal, a digital image signal that uses a frame as a separation unit. The image sensing unit 430 may implement conversion between the optical signal and the electrical signal by using a CCD or CMOS. A process in which the image sensing unit 430 finally converts the received optical signal into the digital image signal that uses a frame as a separation unit may be referred to as image exposure. A frame generated through exposure during which visible light is received but infrared light used for light filling is not received is referred to as a visible light frame, and a frame generated through exposure during which infrared light used for light filling is received is referred to as a fill light frame. When generating the fill light frame, the image sensing unit 430 may receive the infrared light used for light filling but not receive the visible light, or may receive both the infrared light used for light filling and the visible light. This is not limited herein.

The processing unit 440 is configured to control turned-on and turned-off of the fill light unit 410. In some possible implementations, the processing unit 440 periodically turns on and off the fill light unit based on image frame exposure information sent by the image sensing unit 430, so that the image sensor 430 periodically obtains the infrared fill light, and then alternately generates the fill light frame and the visible light frame. The image frame exposure information may be implemented as frame interrupt information including a start-of-frame signal and an end-of-frame signal. For a manner of synchronizing frequency of turning on and off the fill light unit 410 with frame exposure frequency, refer to corresponding content in a description of the embodiment shown in FIG. 3, and details are not described herein again. The processing unit 440 is further configured to control a collection frame rate of the image sensing unit 430, perform basic processing on the digital image signal, and combine the visible light frame and the fill light frame. Basic processing performed on an image includes but is not limited to demosaicing and automatic white balancing. Combining the visible light frame and the fill light frame means generating a composite frame by using the visible light frame and the fill light frame. Brightness information of the composite frame is from the fill light frame, and chrominance information of the composite frame is from the visible light frame. For a specific combining manner, refer to the manners described in the embodiments shown in FIG. 2A and FIG. 2B, and details are not described herein again. Functions of the processing unit 440 may be implemented by one processor, or may be jointly implemented by a plurality of processors. In some possible implementations, some or all of the functions of the processing unit 440 may be integrated in the image sensing unit 430. This is not limited herein.

The ambient light detection unit 450 is configured to detect illuminance of ambient light, and provide illuminance information to the processing unit 440. In some possible implementations, a function of the ambient light detection unit 450 may be alternatively implemented by the image sensing unit 430. This is not limited herein.

Figure 6:
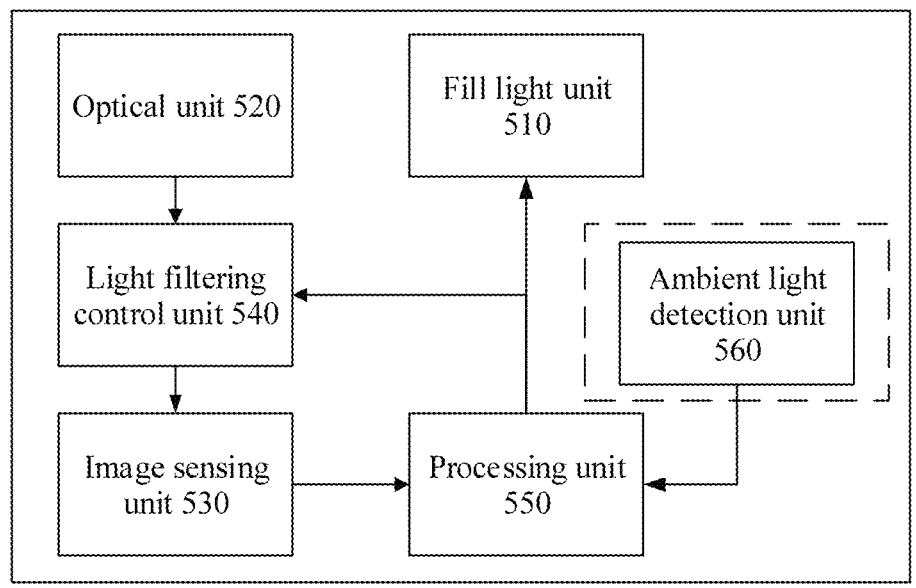
FIG. 6 is a schematic diagram of a logical structure of another fill light imaging apparatus.

FIG. 6 is a schematic diagram of a logical structure of a time division multiplexing fill light imaging apparatus according to another possible embodiment of this application.

As shown in FIG. 6, the imaging device 500 includes a fill light unit 510, an optical unit 520, a light filtering control unit 540, an image sensing unit 530, and a processing unit 550.

The fill light unit 510 is configured to fill light for a photographed object, and may be implemented as an infrared LED fill light lamp. An emission center wavelength that can be used includes but is not limited to 760 nm, 850 nm, or 950 nm. When the fill light imaging apparatus 500 performs fill light imaging, the fill light unit 510 is steady on.

The optical unit 520 is configured to capture light for imaging on the image sensing unit 530, and may be implemented as a lens, including but not limited to a wide-angle lens, a standard lens, a long-focus lens, a zoom lens, a back-focus lens, or a pinhole lens.

The image sensing unit 530 is configured to convert a received optical signal into an electrical signal, and generate, based on the electrical signal, a digital image signal that uses a frame as a separation unit. The image sensing unit 530 may implement conversion between the optical signal and the electrical signal by using a CCD or CMOS. A process in which the image sensing unit 530 finally converts the received optical signal into the digital image signal that uses a frame as a separation unit may be referred to as image exposure. A frame generated through exposure during which visible light is received but infrared light used for light filling is not received is referred to as a visible light frame, and a frame generated through exposure during which infrared light used for light filling is received is referred to as a fill light frame. When generating the fill light frame, the image sensing unit 530 may receive only the infrared light, or may receive both the infrared light and the visible light. This is not limited herein.

The light filtering control unit 540 is configured to enable light of a specific wavelength collected by the optical unit 520 to shine on the image sensing unit 530, and filter out light of another wavelength. The light filtering control unit 540 may change a light filtering characteristic depending on a requirement, to allow light of different wavelengths to pass and shine on the image sensing unit 530. The light filtering control unit 540 may be implemented as a light filter switching apparatus, and changes the light filtering characteristic in a manner of switching between light filters. In some possible implementations, the light filtering control unit 540 periodically changes the light filtering characteristic according to an instruction from the processing unit 550, so that the image sensing unit 530 periodically obtains the infrared fill light, and then alternately generates the fill light frame and the visible light frame. Image frame exposure information may be implemented as frame interrupt information including a start-of-frame-exposure signal and an end-of-frame-exposure signal. For a manner of synchronizing, with frame exposure frequency, frequency at which the light filtering control unit 540 changes the light filtering characteristic, refer to corresponding content in a description of the embodiment shown in FIG. 4, and details are not described herein again.

The processing unit 550 is configured to perform basic processing on the digital image signal, control the light filtering control unit 540, and combine the visible light frame and the fill light frame. Basic processing performed on an image includes but is not limited to demosaicing and automatic white balancing. The processing unit 550 may control, based on image frame exposure information sent by the image sensing unit 530, the light filtering control unit 540 to periodically change the light filtering characteristic, so that the image sensing unit 530 periodically obtains the infrared fill light, and then alternately generates the fill light frame and the visible light frame. That the processing unit 550 combines the visible light frame and the fill light frame means generating a composite frame by using the visible light frame and the fill light frame. Brightness information of the composite frame is from the fill light frame, and chrominance information of the composite frame is from the visible light frame. For a specific combining manner, refer to the manners described in FIG. 2A and FIG. 2B, and details are not described herein again. Functions of the processing unit 550 may be implemented by one processor, or may be jointly implemented by a plurality of processors. In some possible implementations, some or all of the functions of the processing unit 550 may be integrated in the image sensing unit 530. This is not limited herein.

An ambient light detection unit 560 is configured to detect illuminance of ambient light, and provide illuminance information to the processing unit 550. In some possible implementations, a function of the ambient light detection unit 560 may be alternatively implemented by the image sensing unit 530. This is not limited herein.

Figure 7:
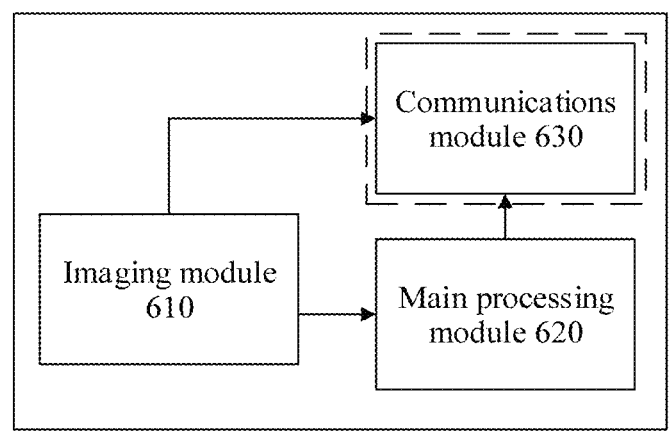
FIG. 7 is a schematic diagram of a logical structure of a terminal device.

FIG. 7 is a schematic diagram of a logical structure of a time division multiplexing fill light imaging terminal device according to a possible embodiment of this application.

The terminal device 600 includes an imaging module 610 and a main processing module 620. In some possible implementations, the terminal device 600 may further include a communications module 630. A specific implementation of the terminal device 600 includes but is not limited to a mobile phone, a tablet computer, and a digital camera that have a photographing function.

The imaging module 610 is configured to generate a composite frame by using the time division multiplexing fill light imaging method described in this application. For a specific manner of generating the composite frame, refer to a related description of FIG. 3 or FIG. 4, and details are not described herein again. An implementation of an internal structure includes but is not limited to a specific form described in FIG. 1, FIG. 5, or FIG. 6. Details are not described herein again. After obtaining the composite frame, the imaging module 610 may send the composite frame to the main processing module 620 for further processing, or may send the composite frame to the communications module 630 for communication.

The main processing module 620 is configured to perform image processing on the composite frame, including but not limited to performing geometric transformation, color adjustment, and image stitching on an image. After completing image processing, the main processing module may send a processed image to the communications module 630 for communication.

The communications module 630 is configured to send an image or a video corresponding to the composite frame to another device through interface transmission or wireless transmission.

Functions of each processor mentioned in the embodiments of this application may be implemented in a form of a hardware-only embodiment, a software-only embodiment (including firmware, resident software, and micro code), or an embodiment with a combination of software and hardware. All of these forms may often be referred to as "circuits", "modules", or "systems". Each processor may be implemented by a field-programmable gate array (FPGA), an application-specific integrated circuit (ASIC), a digital signal processor (DSP), a separate or combined general-purpose processor, and associated software, firmware, and glue logic. Each processor may include one or more processors. When a plurality of processors are included, the plurality of processors may be integrated into a same chip, or each of the plurality of processors may be an independent chip. One processor may include one or more physical cores, where the physical core is a smallest processing module.

It should be understood that "one embodiment", "an embodiment", "an implementation" or "this application," "some implementations" mentioned in the whole specification does not mean that particular features, structures, or characteristics related to the embodiment are included in at least one embodiment of this application. Therefore, "in one embodiment" or "in an embodiment" appearing throughout the specification does not refer to a same embodiment. In addition, these particular features, structures, or characteristics may be combined in one or more embodiments by using any appropriate manner.

It should be understood that in the embodiments of this application, "B corresponding to A" indicates that B is associated with A, and B may be determined based on A. However, it should further be understood that determining A based on B does not mean that B is determined based on A only, that is, B may be alternatively determined based on A and/or other information.

It may be clearly understood by a person skilled in the art that, for the purpose of convenient and brief description, for a detailed working process of the foregoing system, apparatus, and unit, refer to a corresponding process in the foregoing method embodiments, and details are not described herein again. In addition, functional units in the embodiments of this application may be integrated into one processing unit, or each of the units may exist alone physically, or two or more units are integrated into one unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A fill light imaging apparatus comprising:
an image sensor configured to alternately generate a visible light frame and a fill light frame to illuminate a photographed object;
an optical system coupled to the image sensor and comprising:
a single-pass light filter configured to filter out a type of light other than visible light in an imaging light path of the optical system; and
a light filter switching apparatus coupled to the single-pass light filter and configured to place the single-pass light filter in the imaging light path or out of the imaging light path,
wherein the optical system is configured to:
form an image of the photographed object with light that is incident on the image sensor; and
control a type of the light that is incident on the image sensor;
a processor coupled to the image sensor and configured to combine the visible light frame and the fill light frame in an adjacent or consecutive manner to obtain a composite frame of the photographed object; and
a fill light lamp coupled to the processor and configured to illuminate the photographed object with the fill light frame,
wherein the processor is further configured to:
control the fill light lamp to enable fill light to shine on the image sensor when the image sensor starts to generate the fill light frame;
control the fill light lamp to not enable the fill light to shine on the image sensor when the image sensor starts to generate the visible light frame;
control the light filter switching apparatus to place the single-pass light filter out of the imaging light path when the image sensor starts to generate the fill light frame; and
control the light filter switching apparatus to place the single-pass light filter in the imaging light path when the image sensor starts to generate the visible light frame.

2. The fill light imaging apparatus of claim 1, wherein the processor is further configured to:
control the fill light lamp to illuminate the photographed object when the image sensor starts to generate the fill light frame; and
control the fill light lamp to stop illuminating the photographed object when the image sensor finishes generating the fill light frame.

3. The fill light imaging apparatus of claim 1, wherein the visible light frame is adjacent to the fill light frame in the composite frame.

4. The fill light imaging apparatus of claim 1, wherein the processor is further configured to combine a plurality of visible light frames and a plurality of fill light frames to obtain the composite frame, and wherein the visible light frames and the fill light frames are consecutive.

5. The fill light imaging apparatus of claim 1, wherein the image sensor is a charge-coupled device (CCD) or a complementary metal-oxide-semiconductor (CMOS).

6. The fill light imaging apparatus of claim 1, wherein first color information of the composite frame is equal to second color information of the visible light frame, and wherein first brightness information of the composite frame is equal to second brightness information of the fill light frame.

7. The fill light imaging apparatus of claim 1, wherein the fill light is infrared light.

8. The fill light imaging apparatus of claim 5, further comprising an ambient light detector coupled to the processor and configured to detect illuminance of ambient light, wherein the image sensor is further configured to alternately generate the visible light frame and the fill light frame when the illuminance is equal to or less than a preset value.

9. The fill light imaging apparatus of claim 5, wherein the image sensor is further configured to:
  detect illuminance of ambient light using a brightness gain value; and
  alternately generate the visible light frame and the fill light frame when the illuminance is equal to or less than a preset value.

10. The fill light imaging apparatus of claim 6, wherein the processor is further configured to increase a frame rate at which the image sensor collects an image frame when the illuminance is equal to or less than the preset value.

11. The fill light imaging apparatus of claim 8, wherein the processor is further configured to increase the frame rate to a rate n times a collection frame rate used when the illuminance is greater than the preset value, and wherein n is a sum of a first quantity of visible light frames and a second quantity of fill light frames to generate the composite frame.

12. A terminal device, comprising:
  a fill light imaging apparatus comprising:
    an image sensor configured to alternately generate a visible light frame and a fill light frame to illuminate a photographed object;
    an optical system coupled to the image sensor and comprising:
      a single-pass light filter configured to filter out a type of light other than visible light in an imaging light path of the optical system; and
      a light filter switching apparatus coupled to the single-pass light filter and configured to place the single-pass light filter in the imaging light path or out of the imaging light path,
    wherein the optical system is configured to:
      form an image of the photographed object with light that is incident on the image sensor; and
      control a type of the light that is incident on the image sensor;
    a first processor coupled to the image sensor and configured to combine the visible light frame and the fill light frame in an adjacent or consecutive manner to obtain a composite frame of the photographed object; and
    a fill light lamp coupled to the processor and configured to illuminate a photographed object with the fill light frame; and
  a second processor coupled to the fill light imaging apparatus and configured to perform image processing on the composite frame,
  wherein the first processor is further configured to:
    control the fill light lamp to enable fill light to shine on the image sensor when the image sensor starts to generate the fill light frame;
    control the fill light lamp to not enable the fill light to shine on the image sensor when the image sensor starts to generate the visible light frame;
    control the light filter switching apparatus to place the single-pass light filter out of the imaging light path when the image sensor starts to generate the fill light frame; and
    control the light filter switching apparatus to place the single-pass light filter in the imaging light path when the image sensor starts to generate the visible light frame.

13. The terminal device of claim 12, wherein the terminal device further comprises a communications system coupled to the second processor and configured to send an image or a video corresponding to the composite frame to another device through interface transmission or wireless transmission.

14. A fill light imaging method implemented by a fill light imaging apparatus, wherein the fill light imaging method comprises:
  alternately generating a visible light frame and a fill light frame to illuminate a photographed object using an image sensor of the fill light imaging apparatus;
  controlling, using a processor, a fill light lamp to enable fill light to shine on the image sensor when the image sensor starts to generate the fill light frame, wherein the fill light lamp is coupled to the processor and configured to illuminate the photographed object with the fill light frame;
  controlling, using the processor, the fill light lamp to not enable the fill light to shine on the image sensor when the image sensor starts to generate the visible light frame;
  controlling, using a processor, a light filter switching apparatus to place a single-pass light filter out of an imaging light path when the image sensor starts to generate the fill light frame;
  controlling, using a processor, the light filter switching apparatus to place the single-pass light filter in the imaging light path when the image sensor starts to generate the visible light frame; and
  combining, using the processor, the visible light frame and the fill light frame in an adjacent or consecutive manner to obtain a composite frame of the photographed object,
  wherein the light filter switching apparatus is coupled to the single-pass light filter and configured to place the single-pass light filter in the imaging light path or out of the imaging light path,
  wherein the single-pass light filter is configured to filter out a type of light other than visible light in an imaging light path of an optical system, and
  wherein the optical system is coupled to the image sensor and comprises the single-pass light filter and the light filter switching apparatus, and is configured to:
    form an image of the photographed object with light that is incident on the image sensor; and
    control a type of the light that is incident on the image sensor.

15. The fill light imaging method of claim 14, further comprising:
  illuminating the photographed object with the fill light frame; and
  stopping to illuminate the photographed object when the fill light frame finishes.

16. The fill light imaging method of claim 14, wherein the visible light frame and the fill light frame are adjacent.

17. The fill light imaging method of claim 14, further comprising combining a plurality of visible light frames and a plurality of fill light frames to obtain the composite frame, wherein the visible light frames and the fill light frames are consecutive.

* * * * *